(12) United States Patent
Krishnaswamy (10) Patent No.: US 6,463,180 B1
(45) Date of Patent: Oct. 8, 2002

(54) SPATIAL INDEX COMPRESSION THROUGH SPATIAL SUBDIVISION ENCODING

(75) Inventor: Ravinder Patnam Krishnaswamy, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/569,120

(22) Filed: May 10, 2000

Related U.S. Application Data (63) Continuation of application No. 09/088,143, filed on Jun. 1, 1998, now Pat. No. 6,081,624.
(60) Provisional application No. 60/081,043, filed on Apr. 7, 1998.

(51) Int. Cl.$^7$ .................................................. G06K 9/36
(52) U.S. Cl. ....................................................... 382/240
(58) Field of Search ................................. 382/226, 232, 382/240; 341/51; 707/1–10, 100–104, 200–206

(56) References Cited

U.S. PATENT DOCUMENTS

| | | | |
|---|---|---|---|
| 5,280,547 A | | 1/1994 | Mahoney |
| 5,463,389 A | * | 10/1995 | Klayman ..................... 341/51 |
| 5,530,957 A | * | 6/1996 | Koenig ........................ 395/600 |
| 5,551,027 A | * | 8/1996 | Choy et al. .................. 395/600 |
| 5,572,221 A | * | 11/1996 | Marlevi et al. .............. 342/452 |
| 5,592,667 A | * | 1/1997 | Bugajski ...................... 395/163 |
| 5,606,669 A | * | 2/1997 | Bertin et al. ........... 395/200.15 |
| 5,640,551 A | | 6/1997 | Chu et al. |
| 5,647,058 A | | 7/1997 | Agrawal et al. |
| 5,664,174 A | | 9/1997 | Agrawal et al. |
| 5,701,467 A | | 12/1997 | Freeston |
| 5,710,916 A | | 1/1998 | Barbara et al. |
| 5,737,732 A | | 4/1998 | Gibson et al. |
| 5,752,243 A | * | 5/1998 | Reiter et al. .................... 707/3 |
| 5,781,906 A | * | 7/1998 | Aggarwal et al. .......... 707/102 |
| 5,799,312 A | | 8/1998 | Rigoutsos |
| 5,825,936 A | | 10/1998 | Clarke et al. |
| 5,847,761 A | * | 12/1998 | Uz et al. ..................... 348/404 |
| 5,883,823 A | * | 3/1999 | Ding ....................... 364/725.03 |
| 5,884,320 A | | 3/1999 | Agrawal et al. |
| 5,893,104 A | | 4/1999 | Srinivasan et al. |
| 5,945,982 A | * | 8/1999 | Higashio et al. ............ 345/203 |
| 5,953,722 A | * | 9/1999 | Lampert et al. ............ 707/100 |
| 5,963,956 A | * | 10/1999 | Smartt ......................... 707/104 |
| 5,968,109 A | * | 10/1999 | Israni et al. ................. 701/208 |
| 5,977,890 A | * | 11/1999 | Rigoutsos et al. ............ 341/55 |
| 6,081,624 A | * | 6/2000 | Krishnaswamy ............ 382/240 |
| 6,092,065 A | * | 7/2000 | Floratos et al. ................ 707/6 |
| 6,161,105 A | * | 12/2000 | Keighan et al. ............ 707/100 |
| 6,308,177 B1 | * | 10/2001 | Israni et al. ................ 707/100 |

OTHER PUBLICATIONS

Samet, Hanan, "The Design and Analysis of Spatial Data Structure," Addison–Wesley, 1990.
Guttman, Antonin, "R–Trees: A Dynamic Index Structure For Spatial Searching," Proceedings of the Annual Meeting ACM SIGMOD, Boston, MA, 1983, pp. 47–57.
Frank, Andrew U. and Barrera, Renato, "The Fieldtree: A Data Structure for Geographic Information Systems," Design and Implementation of Large Spatial Databases, Lecture Notes in Computer Science Series #409, Springer–Varlag, 1989, pp. 29–44.

* cited by examiner

*Primary Examiner*—Jose L. Couso
(74) *Attorney, Agent, or Firm*—Gates & Cooper LLP (57) ABSTRACT

A technique for reducing the total storage used in representing data having spatial extents. The data is represented in a tree structure having a plurality of nodes, wherein each of the nodes has parent and child relationship to one or more others of the nodes in the tree structure. An encoded representation of the relation of a child node's extents with respect to its parent is stored in the node. A preorder traversal of the tree structure is performed to store it compactly in an output file.

32 Claims, 9 Drawing Sheets

FIG. 5C ered fairly easily. For example, if the first object

SPATIAL INDEX COMPRESSION THROUGH SPATIAL SUBDIVISION ENCODING

CROSS-REFERENCE TO RELATED APPLICATIONS

This application is a Continuation of application Ser. No. 09/088,143, filed Jun. 1, 1998, now U.S. Pat. No. 6,081,624 entitled 'SPATIAL INDEX COMPRESSION THROUGH SPATIAL SUBDIVISION ENCODING', which application is incorporated herein by reference.

This application claims the benefit under 35 U.S.C. §119(e) of co-pending and commonly-assigned U.S. Provisional application serial No. 60/081,043, entitled "SPATIAL INDEX COMPRESSION THROUGH SPATIAL SUBDIVISION ENCODING," filed on Apr. 7, 1998, by Ravinder Patnam Krishnaswamy, which application is incorporated by reference herein.

BACKGROUND OF THE INVENTION

1. Field of the Invention.

This invention relates in general to computer aided design (CAD) systems, and more particularly, to a method, apparatus and article of manufacture for performing spatial index compression through spatial subdivision encoding.

2. Description of Related Art.

Spatial indices are useful in graphical applications such as computer-assisted drafting (CAD), where data has spatial extents and often the user is working with a subset of data defined by a spatial subset of the database extents. In typical CAD applications, the database is saved in a binary file. Since projects are organized and information exchanged through these files, it is beneficial to store data in a compressed form in such a way that access and decoding of the data is efficient as well.

Numerous structures have been proposed to represent spatial data, including an oct-tree and an R-tree, as described in Hanan Samet, "The Design and Analysis of Spatial Data Structures," *Addison-Wesley*, 1990, which is incorporated by reference herein.

Although the oct-tree structure has the benefit of simplicity, there are limitations to the oct-tree:

Objects that lie on partitioning planes end up near the root, even if they are of small extents.

The oct-tree does not handle data that degenerates along a dimension. For example, if the data set consists of buildings of all the same height (Z extent), they will all end up being classified at the root. The oct-tree lacks the ability to adapt to such a situation. A quad-tree would be an appropriate structure for this case.

The R-Tree is object-extent-based, as opposed to global-extent-subdivision-based, as described in A. Guttman, "R-Trees: A Dynamic Index Structure for Spatial Searching," *Proceedings of the Annual Meeting ACM SIGMOD*, Boston, Mass., 1984, which is incorporated by reference herein.

Although the R-Tree has the advantage of generality, there are also limitations to the R-tree:

Input data distribution can skew the R-tree and make it degenerate fairly easily. For example, if the first object added to the tree spans the database extents, then adding subsequent objects will force the node containing the first large) object to migrate to a greater depth. So the tree will essentially become linear. This sensitivity to input data distribution makes it necessary to introduce additional heuristics in tree creation in order to control degeneracies.

The present invention describes a restricted version of the R-tree that enhances the oct-tree to solve specific limitations of the oct-tree. The present invention solves some oct-tree limitations without permitting the degeneracies possible in the general R-tree. For convenience of notation, this structure is called a Cell tree, where each node in the tree is known as a Cell. A pointer-less representation is used for making the structure persistent.

SUMMARY OF THE INVENTION

To overcome the limitations in the prior art described above, and to overcome other limitations that will become apparent upon reading and understanding the present specification, the present invention discloses a method, apparatus and article of manufacture for reducing the total storage used in representing data having spatial extents. The data is represented in a tree structure having a plurality of nodes, wherein each of the nodes has parent and child relationship to one or more others of the nodes in the tree structure. An encoded representation of the relation of a child node's extents with respect to its parent is stored in the node. A preorder traversal of the tree structure is performed to store it compactly in an output file.

DETAIELED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
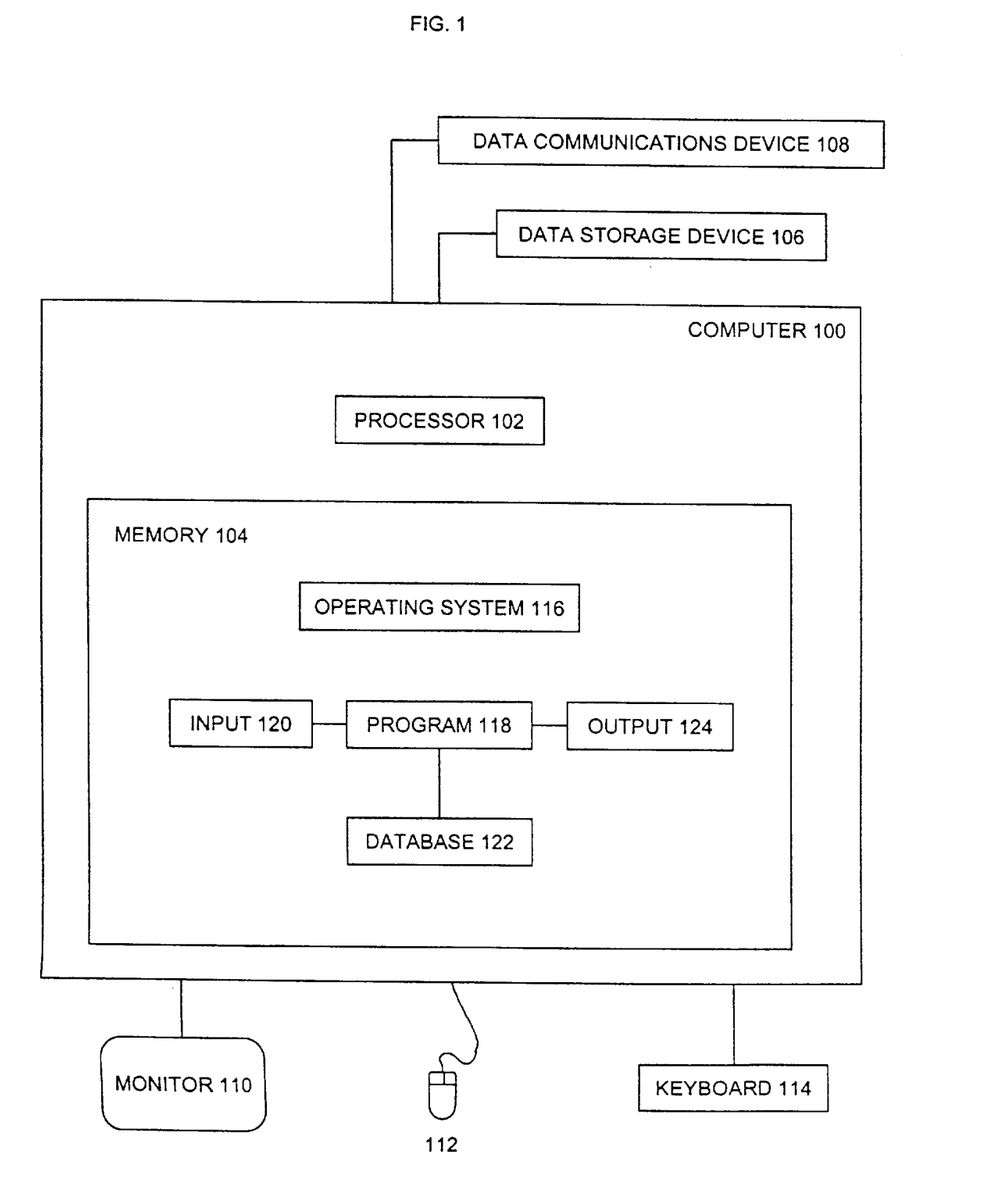
FIG. 1 illustrates an exemplary computer hardware environment that could be used with the present invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as WINDOWS™ (NT, 95, or 3.1), OS/2™, UNIX™, etc. The operating system 116 is booted into the memory 104 of the computer 100 for execution when the computer 100 is powered-on or reset. In turn, the operating system 116 then controls the execution of one or more computer programs 118 by the computer 100. The present invention is generally implemented in the computer program 118, although the present invention may be implemented in the operating system 116 itself.

The computer program 118 usually comprises a computer-assisted drafting program (CAD) program 118 that accepts an input datastream 120 (which may comprise an input datastream, user input, etc.), generates a database 122, and creates an output datastream 124 (which may comprise an output file, screen display, etc.). The operating system 116, CAD program 118, input datastream 120, database 122, and output datastream 124 are comprised of instructions and/or data which, when read, interpreted and/or executed by the computer 100, causes the computer 100 to perform the steps necessary to implement and/or use the present invention.

Generally, the operating system 116, CAD program 118, input datastream 120, database 122, and output datastream 124 are tangibly embodied in and/or readable from a device, carrier, or media, such as memory 104, data storage device 106, and/or remote devices (not shown) connected to the computer 100 via the data communications device 108. Under control of the operating system 116, the CAD program 118, input datastream 120, database 122, and output datastream 124 may be loaded from the memory 104, data storage devices 106, and/or remote devices into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of the Spatial Index Compression

The present invention discloses two approaches for reducing the total storage used for representing an R-Tree-like spatial structure. The first is the use of an encoded representation of the relation of a child node's extents with respect to its parent node. The second is a pointer-less representation using a preorder traversal. These two approaches provide significant memory use benefits.

Cell Tree

Figure 2A:
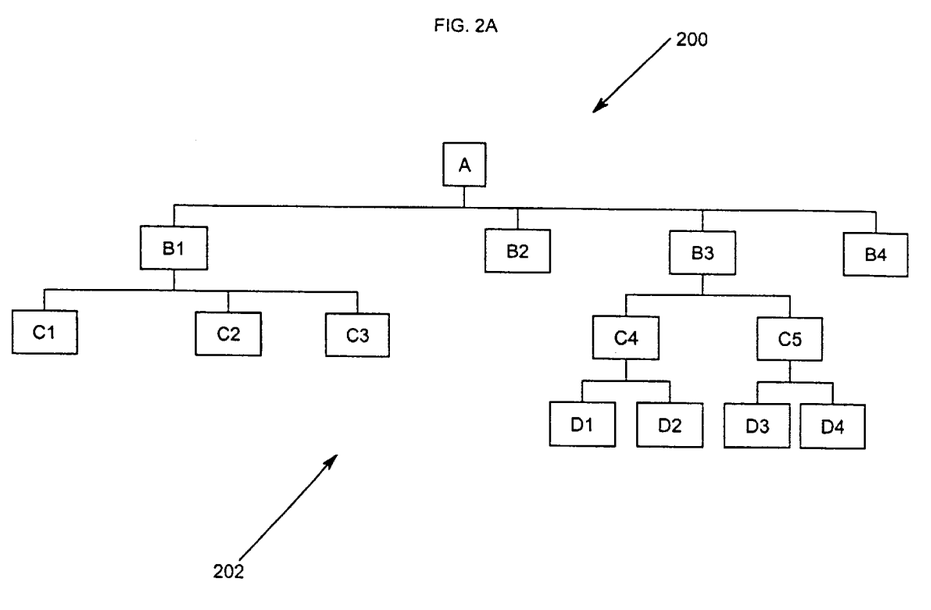
FIGS. 2A and 2B illustrate the structure of Cell trees, each comprised of one or more nodes, according to the present invention.
Figure 2B:
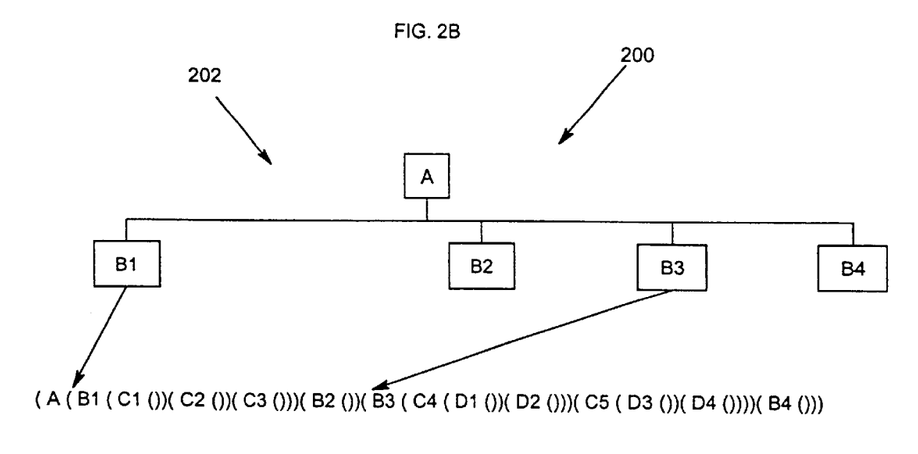

FIGS. 2A and 2B illustrate the structure of Cell trees 200, each comprised of one or more nodes 202, according to the present invention. The Cell tree 200 used in the present invention is an n-ary tree, with each root node 202 of a subtree containing the extents of each Cell node 202 in its subtree. In the example of FIG. 2A, the Cell node 202 labeled as B1 is a root Cell node 202 relative to a subtree comprised of the subordinate Cell nodes 202 labeled as C1, C2, and C3.

A child Cell node 202 is constrained to subdivide the extents of its parent Cell node 202 in the following ways:

Node of Type 1: It is a normal octant subdivision.
Node of Type 2: It is an expanded version of an octant subdivision. The expansion is along the coordinate planes that divide the root extents, and is by $\frac{1}{16}^{th}$ of the root Cell node 202 extents.
Node of Type 3: It merges two of the expanded Cell node 202 octants along a coordinate axis.

The introduction of Cell nodes 202 of type 2 makes sure that objects that are no larger than $\frac{1}{8}^{th}$ of all the Cell node 202 extent dimension are pushed at least one level deeper into the Cell tree 200. This is based on an idea mentioned in Andrew U. Frank and Renato Barrera, "The Fieldtree: A Data structure for Geographic Information Systems," *Design and Implementation of Large Spatial Databases, Lecture Notes in Computer Science series* #409, Springer-Verlag, 1989, which is incorporated by reference herein.

The introduction of Cell nodes 202 of type 3 is original to the present invention, and solves the problem of classifying data that spans the extents along a coordinate axis. For example, if the data set consists of all buildings with the same Z height, the oct-tree would not be a good representation. By collapsing adjacent Cell nodes 202 into one Cell node 202, the Cell tree 200 starts assuming the form of a quad-tree.

It is possible to extend the Cell node 202 of type 3 to including merging Cell nodes 202 along two coordinate axes (type 4). While this may be used in alternative embodiments, the preferred embodiment of the present invention uses types 1–3.

To store the Cell tree 200 compactly in the database 122 and output datastream 124 (for example, a .dwg file used by the AUTOCAD® product sold by the assignee of the present invention), a standard preorder traversal of the Cell tree 200 is performed. Therefore, a Cell tree 200 whose structure is shown in FIG. 2A would be stored in the database 122 and output datastream 124 as:

(A (B1 (C1 ( )) (C2 ( )) (C3 ( ))) (B2 ( )) (B3 (C4 D1 ( )) D2 ( ))) (C5 D3 ( )) D4 ( )))) (B4 ( )))

A Cell node 202 in the Cell tree 200 is in one of two possible states: realized or unrealized. If the Cell node 202 is unrealized, this means the representation of its subtree is stored in the database 122 and output datastream 124 in the pre-order traversal format.

For example, in the Cell tree 200 of FIG. 2A, if Cell nodes 202 B 1 and B3 are unrealized, this would mean that instead of pointing to the first child Cell node 202 in its subtree, each of the Cell nodes 202 contains an offset into a buffer that has the start token of its subtree. FIG. 2B provides an example of this result.

Cell Node

Figure 3A:
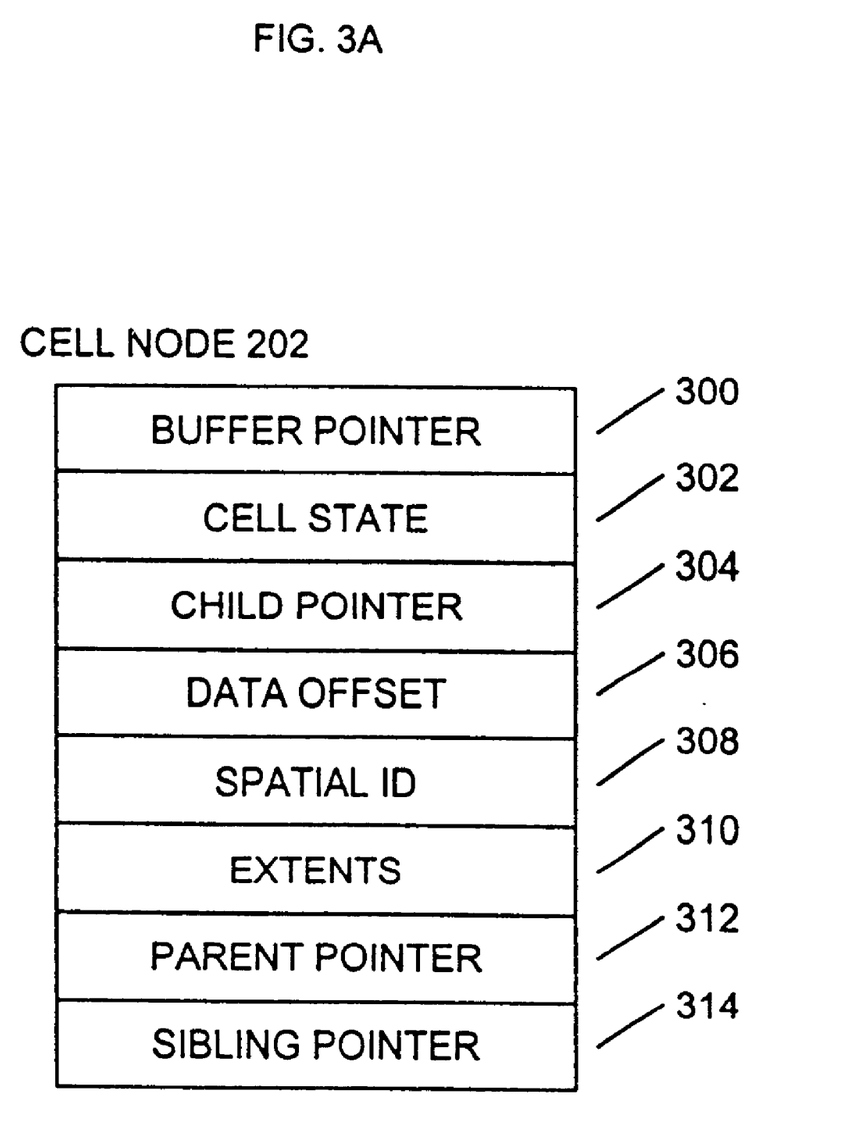
FIG. 3A is a block diagram that illustrates the structure of a Cell node according to the present invention.

FIG. 3A is a block diagram that illustrates the structure of a Cell node 202 according to the present invention. The Cell node 202 includes a number of fields including a Buffer Pointer 300, Cell State 302, Child Pointer 304, Data Offset 306, Spatial ID 308, Extents 310, Parent Pointer 312, and Sibling Pointer 314. The Buffer Pointer 300, Cell State 302, Child Pointer 304, Parent Pointer 312, and Sibling Pointer 314 implement the in-memory representation of the Cell node 202. The Data Offset 306 is the offset into the buffer when the Cell State 302 is "Compressed Subtree," which is illustrated in FIG. 2B. The Spatial ID 308 and Extents 310 implement the spatial index of the present invention.

Figure 3B:
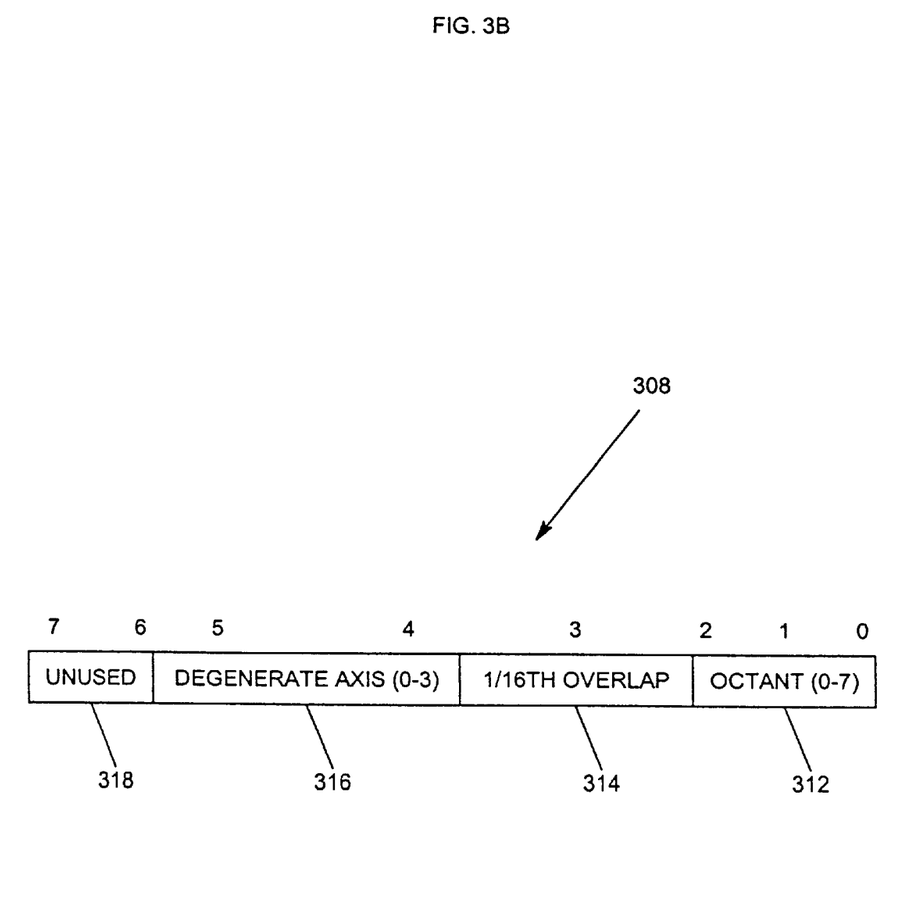
FIG. 3B is a block diagram that illustrates format of a Spatial ID according to the present invention.

FIG. 3B is a block diagram that illustrates format of a Spatial ID 308 according to the present invention. The Spatial ID 308 encodes the relation of a child Cell node 202 to its parent Cell node 202. This makes it possible to obtain the Extents 310 of a Cell node 202 without explicitly storing the data. In this embodiment, the Spatial ID 308 includes an octant 312, $1/16^{th}$ overlap 314, degenerate axis 316, and an unused portion 320 for further expansion of its functions.

Therefore, a Spatial ID 308 having a binary value of b'00000010' would mean an octant of 2, and a Spatial ID 308 having a binary value of b'00011010' would mean a $1/16^{th}$ expanded version of octant 2 that is merged with its X-axis neighbor, i.e., $1/16^{th}$ expanded octant Cell 3.

The Cell tree 200 requires that each Cell node 202 has pointers to its:

Parent

First Child

Sibling as in a standard n-ary tree representation.

The addition of a data object entity to the Cell tree 200 is similar to an R-tree addition procedure. The first Cell node 202 that will fit the entity is accepted. This requires traversing siblings of the first child Cell node 202 of a Cell node 202, and identifying which Cell node 202 includes the Extents 310 that are specified by the Spatial ID 308. Due to the encoding mechanism, containment can be determined by interpreting the bit settings.

One advantage of using a Spatial ID 308 is that the Extents 310 of each Cell node 202 need not be explicitly stored, but can be computed from a traversal from the root node. If the integer Extents 310 are 32 bit per coordinate, then the savings are the use of 1 byte per Cell node 202 instead of 24 bytes.

Database and Output Datastream

Figure 4:
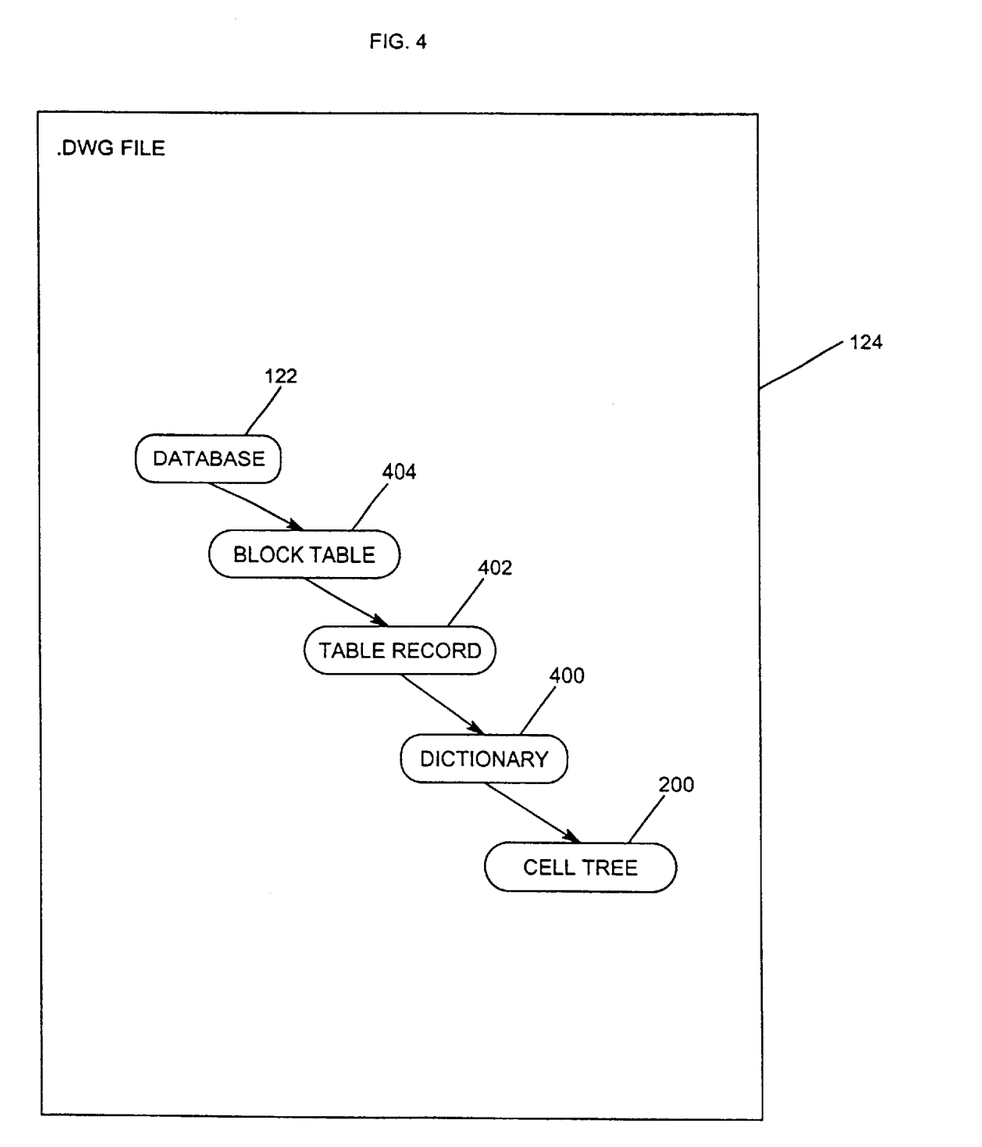
FIG. 4 illustrates the format of the database and output datastream according to the present invention.

FIG. 4 illustrates the format of the database 122 and output datastream 124 according to the present invention. A Cell tree 200 is stored on an extension dictionary 400 of a table record 402 of a block table 404 within the database 122 that may or may not be stored in the output datastream 124.

Benefits and Space Analysis

The benefits from using the Spatial ID 308 encoding of the relative extents of a Cell node 202 with respect to its parent Cell node 202 are:*

It provides a restricted R-tree representation that avoids degeneracies, yet provides a solution to some of the limitations of the octtree.

It provides memory savings both in-memory and ondisk when 1 byte is used instead of explicitly using the 3D extents of the Cell node 202 (which for 32 bit extents is 24 bytes).

The benefits from using the preorder traversal representation as a persistent storage mechanism include the following:

It eliminates 3 pointers per Cell node 202. This could effectively add up to 12 bytes per Cell node 202 using 32-bit offsets. The tokens take up 2 bytes.

A Cell tree 200 query is implemented so that subtrees are expanded only when queried. A query on an unrealized root Cell node 202 of a Cell tree 200 would result in expanding (realizing) only those Cell nodes 202 visited due to their interaction with the query volume . This leads to memory savings, since Cell nodes 202 will not be allocated for unrealized subtrees.

Consider the following simplified analysis on the space savings due to the above schemes. Assume a uniform distribution with an average of 20 objects per Cell node 202.

The overhead in storing the object references in a Cell node 202 in a compressed form ranges typically from 1.5–2.5 bytes (since they are sorted, and the relative handle values are stored).

The fixed overhead for object data is a 4 byte data block size and 4 bytes (typically) of base object reference handle value. So, the object data overhead per Cell node 202 would be 4+4+20* (average bytes per reference), which is 38 to 58 bytes. The fixed overhead for a Cell node 202 would be 4 bytes of block size information, 2 bytes for preorder traversal token information and a 1 byte Spatial ID 308, i.e., 7 bytes. So, with the Spatial ID 308 representation, the space taken by a Cell node 202 in this model is 45–65 bytes.

If the Cell node 202 stored a 32 bit 3D extent instead of the 1 byte Spatial ID 308, the space taken would be 68–88 bytes. This represents a 51% to 35% increase in space from the representation with the extent encoding.

Consider the following asymptotic analysis on the savings in the number of Cell nodes 202 that need to be allocated due to the lazy reconstruction of the Cell tree 200 during a query.

Assume a 3D query and let the volume of the query be a cube $1/10^{th}$ of the dimension of the database along each coordinate axis. That is, the query is $1/1000^{th}$ of the database volume.

For simplicity, assume the Cell tree 200 is full oct-tree. Let N be the total number of Cell nodes 202 in the Cell tree 200, let the depth of the Cell tree 200 be d, and let L be the number of leaf Cell nodes 202.

Then:

$$L=8^d$$

$$N=8^{d+1}-1/7$$

Assume that the number of leaves processed by the query is in proportion to the ratio of the query volume to the extents. This would be no more than the leaf Cell nodes 202 inside the query cube plus the leaf Cell nodes 202 along each of the surfaces of the query cube. Namely:

$$L_q=(L^{1/3}/10)^3+6*(L^{1/3}/10)^2$$

To compute how many non-leaf Cell nodes 202 are processed by the query, consider the following. For each cube block of Cell nodes 202, except for Cell nodes 202 possibly on 3 of its 6 faces, all the remaining Cell nodes 202 are part of a complete octant (i.e., a Cell node 202 shares an ancestor with 7 other Cell nodes 202). Of the 3 faces, all the Cell nodes 202 except those on up to 6 edges share an ancestor with 3 other Cell nodes 202.

So, the number of ancestors for the block of $L_q$ Cell nodes 202 is no more than:

$$N_a=a^3/8+3a^2/4+6a$$

where:

$$a=L_q^{1/3}$$

For a>5, see that:

$$a^2+6a+48 \leq 4a^2$$

and hence:

$$N_a < L_q/2$$

Using the same argument at each level, the total number of ancestors will be:

$$L_q/2(1+1/2++1/2^{d-1}) \approx L_q$$

Since each non-leaf cell will bring in 7 more Cell nodes 202 that are in an unrealized state, the total number of non-leaf Cell nodes 202 allocated will be less than:

$$L_q * 8$$

Assuming d=5, i.e., a tree with 37449 Cell nodes 202, the number of Cell nodes 202 visited by the query are:

$$(85/100 + 6 * 45/100)(1+8) \approx 848$$

In this case, the proportion of the Cell tree 200 expanded is only:

$$848/37449 \approx 2\%$$

In the two (quad-tree like Cell tree 200) dimensional case, a similar analysis, with d=7 yields:

$$N=21845, L=16384$$

and the number of Cell nodes 202 visited by the query as:

$$(47/100 + 4 * 27/10)(1+4) \approx 1073$$

The proportion of the Cell tree 200 expanded in this case is:

$$1073/21845 \approx 5\%$$

For a smaller tree, with d=4, say, and a quad-tree like Cell tree 200, N=341 and L=256, the number of Cell nodes 202 visited by the query is:

$$(43/100 + 4 * 21/10)(1+4) \approx 45$$

and the proportion of Cell tree 200 expanded in this case is:

$$45/341 \approx 13\%$$

Table 1 provides statistics from some sample drawings from different application areas. There is one artificial example in row 4 of Table 1, consisting of a rectangular 100×100 array of lines with a $1/10^{th}$ square query to provide statistics on "ideal" conditions of object distribution.

The databases of Table 1 are all effectively 2D, except for the GIS (geographic information system or mapping example, where the query is 2.5D. That is, the Z-axis extent of the query spanned the database Z extent. The X and Y dimensions of the query were approximately $1/5^{th}$ to $1/10^{th}$ of the extents along the axes.

The samples are consistent with expectations from the structure. The GIS example provides a higher percentage of Cell nodes 202 expanded during the query since it consists of many contour lines that span most of the database extents. Also, the Cell tree 200 is less of a quad-tree like structure, since it adapts to the 3D data. Hence, the 2.5D query results in more "hits" of Cell nodes 202.

Logic of the Spatial Index Compression

Figure 5A:
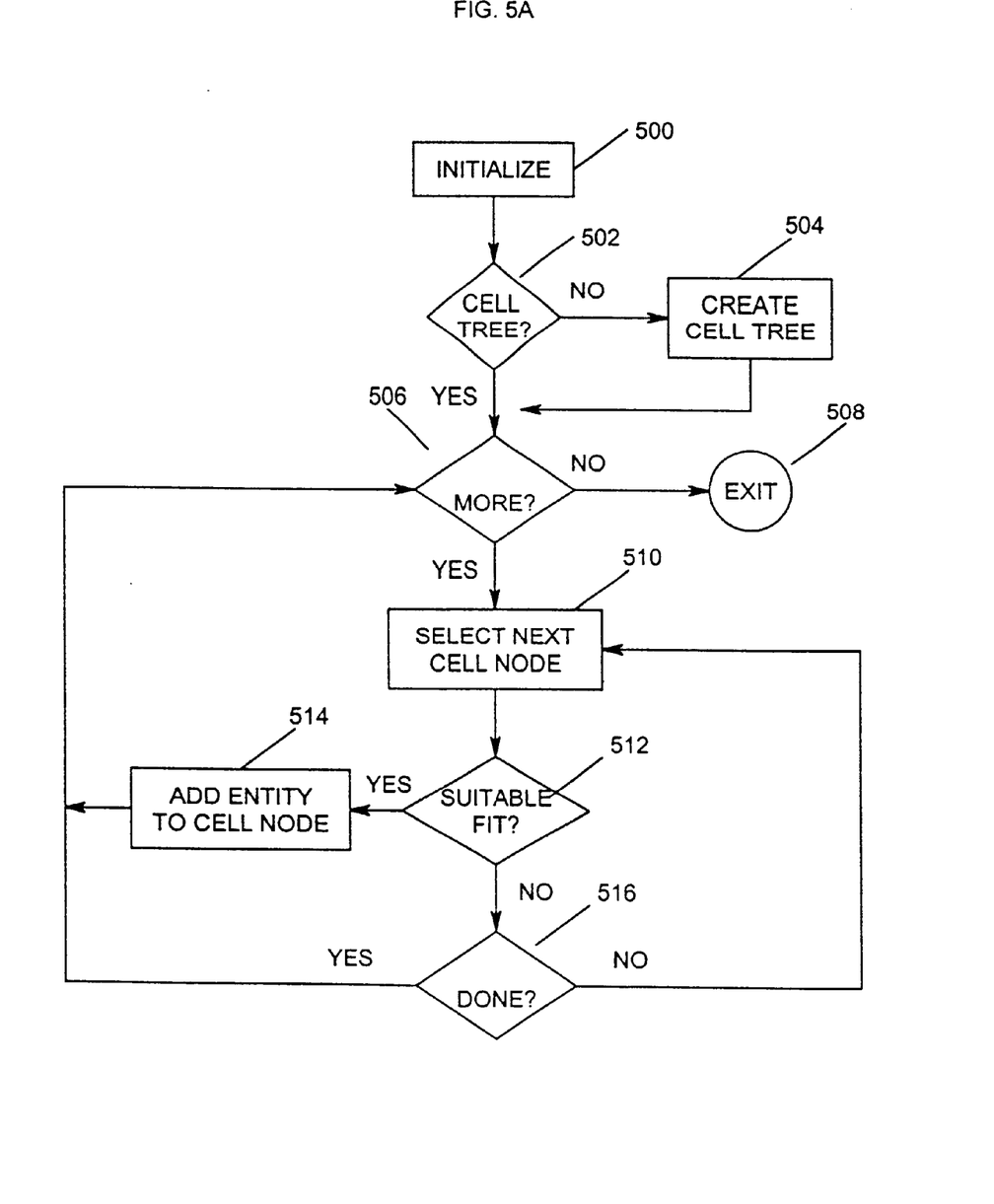
FIGS. 5A, 5B, and 5C are flowcharts that illustrate the logic performed by a computer-assisted drafting (CAD) program according to the present invention
Figure 5B:
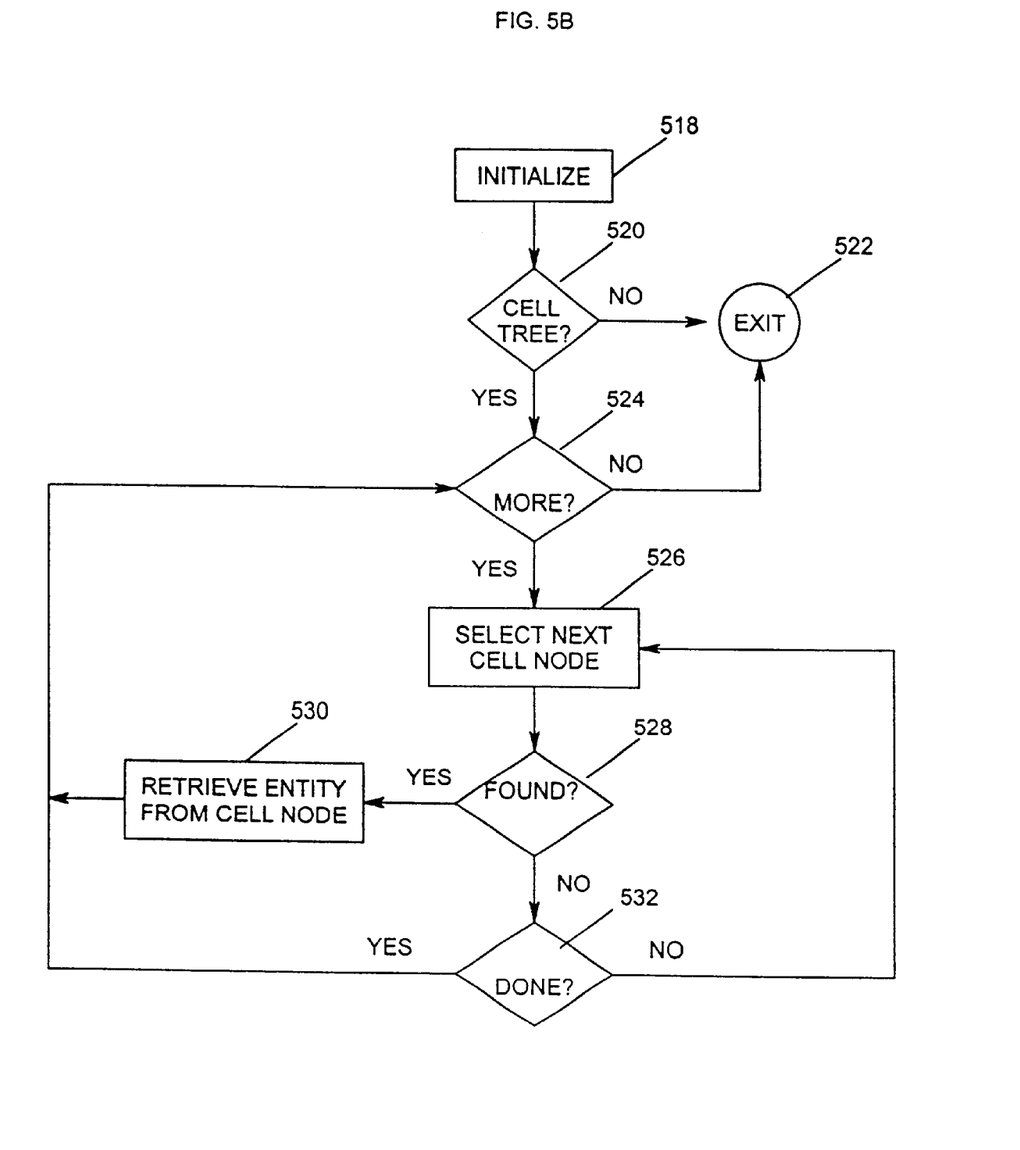
Figure 5C:
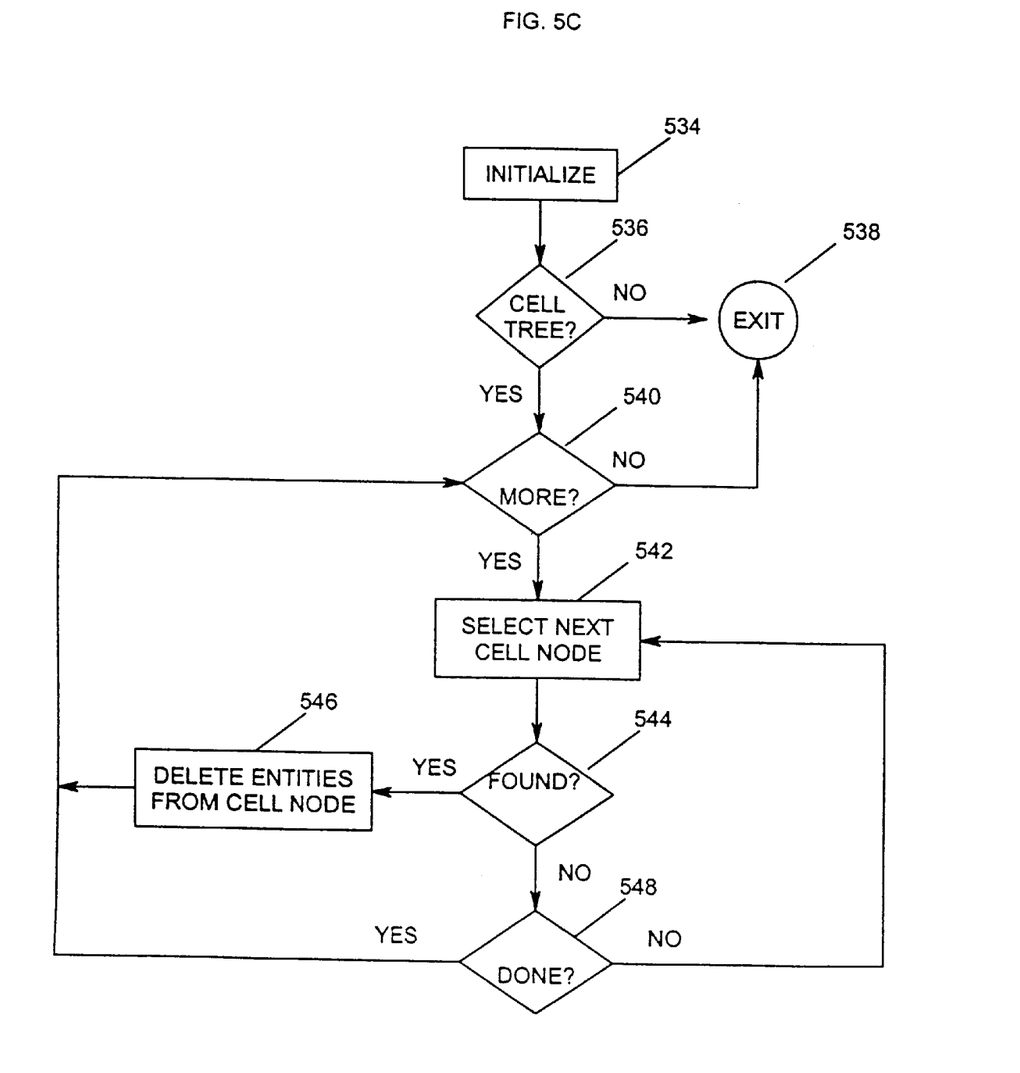

FIGS. 5A, 5B, and 5C are flowcharts that illustrate the logic performed by the CAD program 118 according to the present invention. Those skilled in the art will recognize that other logic could be substituted therefor without departing from the scope of the present invention.

FIG. 5A is a flowchart that illustrates the logic performed by the CAD program 118 when creating a Cell tree 200 and/or adding a data object entity to a Cell tree 200 according to the present invention.

Block 500 represents any initialization steps that may be required.

Block 502 is a decision block that represents the CAD program 118 determining whether a Cell tree 200 exists in the current database 122. If not, control transfers to Block 504 to create a Cell tree 200.

Blocks 506–516 together are a loop that represents the CAD program 118 adding entities to the Cell tree 200.

Block 506 is a decision block that represents the CAD program 118 determining whether more entities exist to be added to the Cell tree 200. If not, control transfers to Block 508, which terminates the logic; otherwise, control transfers to Block 510.

Blocks 510–516 together are a loop that represents the CAD program 118 traversing the Cell tree 200 until it finds a Cell node 202 where the extents will fit.

Block 510 represents the CAD program 118 selecting a next Cell node 202 from the Cell tree 200 (or a root Cell node 202 for the first traversal).

Block 512 is a decision block that represents the CAD program 118 determining the suitable Cell node 202 for the entity to fit into. If so, control transfers to Block 514, which represents the CAD program 118 adding the entity to the Cell node, and then back to Block 506; otherwise, control transfers to Block 516.

Block 516 is a decision block that represents the CAD program 118 determining whether the CAD program is done examining Cell nodes 202. If not, control transfers to Block 510; otherwise, control transfers to Block 506.

FIG. 5B is a flowchart that illustrates the logic performed by the CAD program 118 when traversing a Cell tree 200 searching for a particular data object entity according to the present invention.

Block 518 represents any initialization steps that may be required.

Block 520 is a decision block that represents the CAD program 118 determining whether a Cell tree 200 exists in the current database 122. If not, control transfers to Block 522, which terminates the logic.

Blocks 524–532 together are a loop that represents the CAD program 118 searching for another entity in the Cell tree 200.

Block 524 is a decision block that represents the CAD program 118 determining whether more entities exist to be searched in the Cell tree 200. If not, control transfers to Block 522, which terminates the logic; otherwise, control transfers to Block 526.

Blocks 526–532 together are a loop that represents the CAD program 118 traversing the Cell tree 200 until it finds a Cell node 202 having the extent.

Block 526 represents the CAD program 118 selecting a next Cell node 202 from the Cell tree 200 (or a root Cell node 202 for the first traversal).

Block 528 is a decision block that represents the CAD program 118 determining whether the entity is associated with the selected Cell node 202. If so, control transfers to Block 530, which represents the CAD program 118 retrieving the entity, and then back to Block 524; otherwise, control transfers to Block 532.

Block 532 is a decision block that represents the CAD program 118 determining whether the CAD program is done examining Cell nodes 202. If not, control transfers to Block 526; otherwise, control transfers to Block 524.

FIG. 5C is a flowchart that illustrates the logic performed by the CAD program 118 when deleting data object entities from a Cell tree 200 according to the present invention.

Block 534 represents any initialization steps that may be required.

Block 536 is a decision block that represents the CAD program 118 determining whether a Cell tree 200 exists in the current database 122. If not, control transfers to Block 538, which terminates the logic.

Blocks 540–548 together are a loop that represents the CAD program 118 searching for another entity in the Cell tree 200.

Block 540 is a decision block that represents the CAD program 118 determining whether more entities exist to be deleted from the Cell tree 200. If not, control transfers to Block 538, which terminates the logic; otherwise, control transfers to Block 542.

Blocks 542–548 together are a loop that represents the CAD program 118 traversing the Cell tree 200 until it finds a Cell node 202 having the extent.

Block 542 represents the CAD program 118 selecting a next Cell node 202 from the Cell tree 200 (or a root Cell node 202 for the first traversal).

Block 544 is a decision block that represents the CAD program 118 determining whether the entities are associated with the selected Cell node 202. If so, control transfers to Block 546, which represents the CAD program 118 deleting the entities, and then back to Block 540; otherwise, control transfers to Block 548.

Block 548 is a decision block that represents the CAD program 118 determining whether the CAD program is done examining Cell nodes 202. If not, control transfers to Block 542; otherwise, control transfers to Block 540.

Conclusion

This concludes the description of the preferred embodiment of the invention. In summary, the present invention comprises a method, apparatus, and article of manufacture for reducing the total storage used in representing data having spatial extents. The data is represented in a tree structure having a plurality of nodes, wherein each of the nodes has parent and child relationship to one or more others of the nodes in the tree structure. An encoded representation of the relation of a child node's extents with respect to its parent is stored in the node. A preorder traversal of the tree structure is performed to store it compactly in an output file.

The following paragraphs described some alternative ways of accomplishing the present invention. Those skilled in the art will recognize that different computer programs, operating environments, and operating systems could be substituted for those described herein. Those skilled in the art will recognize that the present invention could be used by any type of computer, and need not be limited to a personal computer. Those skilled in the art will recognize that the present invention could be used by any type of graphics system, and need not be limited to the example described herein. Those skilled in the art will recognize that alternate approaches to formatting the database and output datastream could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| Sample Drawing type | Total # Cells in the Cell tree | Total # Objects in the Cell tree | # Cells visited during query | # Objects visited during the query | Average # Objects per Cell | % of Cells expanded by query |
|---|---|---|---|---|---|---|
| AEC | 512 | 5743 | 94 | 533 | 11 | 18 |
| GIS | 472 | 5001 | 133 | 995 | 11 | 28 |
| Electrical | 295 | 2353 | 41 | 266 | 8 | 14 |
| 100x100 Rect. Array of 10000 lines (synthetic case). | 697 | 10000 | 49 | 185 | 14 | 7 |

What is claimed is:

1. A computer-implemented method for representing and encoding data having spatial extents, comprising:
    (a) representing the data in a tree structure having a plurality of nodes; and
    (b) encoding a spatial identifier for each node as a representation of the node's extents with respect to its parent's extents, wherein the encoded spatial identifier includes at least octant, $\frac{1}{16}^{th}$ overlap, and degenerate axis Values.

2. The method of claim 1 above, wherein the spatial identifier identifies the node's extents as a subdivision of the parent's extents.

3. The method of claim 2 above, wherein the subdivision comprises an octant subdivision.

4. The method of claim 2 above, wherein the subdivision comprises a $\frac{1}{16}^{th}$ expanded version of an octant subdivision along coordinate planes that divide root extents.

5. The method of claim 2 above, wherein the subdivision comprises a merger of a plurality of expanded octants along a coordinate axis.

6. The method of claim 5 above, wherein the node classifies data that spans the extents along a coordinate axis.

7. The method of claim 5 above, wherein the node comprises a merger of nodes along two coordinate axes.

8. The method of claim 1 above, wherein the spatial identifier is stored in an extension dictionary of a table record of a block table within a database of a datastream.

9. A computer-implemented apparatus for representing and encoding data having spatial extents, comprising:
    (a) means for representing the data in a tree structure having a plurality of nodes; and
    (b) means for encoding a spatial identifier in each node as a representation of the node's extents with respect to its parent's extents, wherein the encoded spatial identifier includes at least octant, $\frac{1}{16}$ overlap, and degenerate axis values.

10. The apparatus of claim 9 above, wherein the spatial identifier identifies the node's extents as a subdivision of the parent's extents.

11. The apparatus of claim 10 above, wherein the subdivision comprises an octant subdivision.

12. The apparatus of claim 10 above, wherein the subdivision comprises a $\frac{1}{16}^{th}$ expanded version of an octant subdivision along coordinate planes that divide root extents.

13. The apparatus of claim 10 above, wherein the subdivision comprises a merger of a plurality of expanded octants along a coordinate axis.

14. The apparatus of claim 13 above, wherein the node classifies data that spans the extents along a coordinate axis.

15. The apparatus of claim 13 above, wherein the node comprises a merger of nodes along two coordinate axes.

16. The apparatus of claim 9 above, wherein the spatial identifier is stored in an extension dictionary of a table record of a block table within a database of a datastream.

17. An article of manufacture embodying logic for representing and encoding data having spatial extents, comprising:
  (a) representing the dam in a tree structure having a plurality of nodes; and
  (b) encoding a spatial identifier for each node as a representation of the node's extents with respect to its parent's extents, wherein the encoded spatial identifier includes at least octant, $1/6^{th}$ overlap, and degenerate a values.

18. The article of manufacture of claim 17 above, wherein the spatial identifier identifies the node's extents as a subdivision of the parent's extents.

19. The article of manufacture of claim 18 above, wherein the subdivision comprises an octant subdivision.

20. The article of manufacture of claim 18 above, wherein the subdivision comprises a $1/16^{th}$ expanded version of an octant subdivision along coordinate planes that divide root extents.

21. The article of manufacture of claim 18 above, wherein the subdivision comprises a merger of a plurality of expanded octants along a coordinate axis.

22. The article of manufacture of claim 21 above, wherein the node classifies data that spans the extents along a coordinate axis.

23. The article of manufacture of claim 21 above, wherein the node comprises a merger of nodes along two coordinate axes.

24. The article of manufacture of claim 17 above, wherein the spatial identifier is stored in an extension dictionary of a table record of a block table within a database of a datastream.

25. A data structure stored in a data storage device for representing and encoding data having spatial extents, the data structure comprising a tree structure having a plurality of nodes, wherein a spatial identifier is encoded for each node as a representation of the node's extents with respect to its parent's extents, wherein the encoded spatial identifier includes at least octant, $1/16^{th}$ overlap, and degenerate axis values.

26. The data structure of claim 25 above, wherein the spatial identifier identifies the node's extents as a subdivision of the parent's extents.

27. The data structure of claim 26 above, wherein the subdivision comprises an octant subdivision.

28. The data structure of claim 26 above, wherein the subdivision comprises a $1/16^{th}$ expanded version of an octant subdivision along coordinate planes that divide root extents.

29. The data structure of claim 26 above, wherein the subdivision comprises a merger of a plurality of expanded octants along a coordinate axis.

30. The data structure of claim 29 above, wherein the node classifies data that spans the extents along a coordinate axis.

31. The data structure of claim 29 above, wherein the node comprises a merger of nodes along two coordinate axes.

32. The data structure of claim 25 above, wherein the spatial identifier is stored in an extension dictionary of a table record of a block table within a database of a datastream.

* * * * *

UNITED STATES PATENT AND TRADEMARK OFFICE
CERTIFICATE OF CORRECTION

PATENT NO.    : 6,463,180 B1  
DATED         : October 8, 2002  
INVENTOR(S)   : Ravinder Patnam Krishnaswamy It is certified that error appears in the above-identified patent and that said Letters Patent is hereby corrected as shown below:

Column 10,  
Line 27, "Values" should read -- values --  
Line 53, "1/16" should read -- $1/16^{th}$ --

Column 11,  
Line 9, "dam" should read -- data --  
Line 14, "1/6" should read -- $1/16^{th}$- --  
Line 14, "a" should read -- axis --

Signed and Sealed this

Sixth Day of May, 2003

JAMES E. ROGAN  
*Director of the United States Patent and Trademark Office*